United States Patent [19]

Wadekamper

[11] Patent Number: 5,641,435
[45] Date of Patent: Jun. 24, 1997

[54] CONTROL OF RESIDUAL GAS CONTENT OF NUCLEAR FUEL

[75] Inventor: Donald C. Wadekamper, Pleasanton, Calif.

[73] Assignee: General Electric Company, Schenectady, N.Y.

[21] Appl. No.: 532,395

[22] Filed: Sep. 22, 1995

[51] Int. Cl.⁶ ................................................ C09K 11/04
[52] U.S. Cl. .................. 252/643; 264/0.5; 976/DIG. 96
[58] Field of Search ........................ 252/643; 264/0.5; 976/DIG. 96

[56] References Cited

U.S. PATENT DOCUMENTS

| | | | |
|---|---|---|---|
| 3,717,582 | 2/1973 | Lindemer et al. | 252/643 |
| 3,872,022 | 3/1975 | De Hollander et al. | 252/638 |
| 4,158,681 | 6/1979 | Funke | 264/0.5 |
| 4,298,495 | 11/1981 | James et al. | 252/643 |
| 4,348,339 | 9/1982 | Assmann et al. | 264/0.5 |
| 4,738,564 | 4/1988 | Bottillo | 405/128 |
| 4,749,529 | 6/1988 | Halldahl | 264/0.5 |

FOREIGN PATENT DOCUMENTS 64-25093  1/1989  Japan.

OTHER PUBLICATIONS

Harada, Y. et al; Manufacturing Method of Oxide Nuclear Fuel Body, 1989.

*Primary Examiner*—Ngoclan Mai
*Attorney, Agent, or Firm*—Nixon & Vanderhye P.C.

[57] ABSTRACT

The present invention relates, in general, to a method of producing mixed oxide nuclear fuel and, in particular, to a method of reducing the amount of residual gas absorbed on fuel pellets after sintering.

6 Claims, 6 Drawing Sheets

CONTROL OF RESIDUAL GAS CONTENT OF NUCLEAR FUEL

TECHNICAL FIELD

The present invention relates, in general, to a method of producing mixed oxide nuclear fuel and, in particular, to a method of reducing the amount of residual gas absorbed on fuel pellets after sintering.

BACKGROUND

Recently, there has been a renewed interest in the fabrication technology for mixed oxide (MOX) nuclear fuel pellets and, hence, a renewed interest in the sintering operation that comprises the critical processing step in the fabrication of such pellets. Sintering establishes both the physical and chemical properties of the nuclear fuel necessary for reactor irradiation.

Ideally, the residual gas content of sintered fuel pellets should be as low as possible since, as the fuel pellets are heated in the reactor, release of residual gas can cause pressurization of the fuel rods. Fuel designs that can accommodate this released gas require larger plenum volumes or stronger cladding, both of which result in more costly fuel rods. Larger or stronger fuel rods result in a larger reactor core which again increases overall costs.

The sintering of urania fuel has been typically accomplished with a moisture addition to reduce the halide concentrations which carry over from the feed material conversion process. Since very large moisture additions are utilized to assure the removal of halides, moisture can accumulate on the sintered pellet surfaces in the exit portion of the furnace. Humidity in the atmosphere which comes in contact with the sintered pellets can also result in moisture absorption on the pellet surfaces. Urania fuel has been traditionally vacuum outgassed at elevated temperatures to remove all residual moisture. The moisture addition during sintering has unknowingly prevented high residual gas content in urania fuel so that no problem has been identified. The outgassing operation also removes any residual gas from the pellets assuring that high gas content is not a problem.

Since the feed materials for MOX fabrication are very pure (low halide and impurity concentrations), dry atmospheres with no oxygen additions have been utilized to sinter the fuel. This sintering approach tends to prolong the furnace component life because oxygen additions degrade the molybdenum components (eg boats and windings) via the formation of molybdenum oxide. The MOX fuel pellets produced by sintering in a dry atmosphere, however, exhibit residual gas contents that are higher than the values allowed in the fuel design specification. A vacuum outgas process at elevated temperature has been used to reduce the residual gas content to a value below the design limits. The necessity for this step, however, increases the overall cost of the fuel production process.

OBJECTS AND SUMMARY OF THE INVENTION

It is a general object of the invention to provide a method of controlling the residual gas content of nuclear fuel pellets.

It is a more specific object of the invention to provide a method of controlling the residual gas content of fuel pellets that avoids the necessity for an outgassing process step and the necessity of using costly carrier gases, such as argon or helium.

The present invention meets these objectives by providing a method of reducing the residual gas content of mixed oxide MOX nuclear fuel sintered in a furnace in a reducing atmosphere comprising contacting the fuel during sintering with oxygen so that absorption of residual gas by the fuel is inhibited.

Further objects and advantages of the invention will be clear from the description that follows.

DETAILED DESCRIPTION OF THE INVENTION

The present invention results from the realization that the introduction of small quantities of oxygen into selected areas of a sintering furnace can be utilized to control the residual gas content of MOX fuel pellets. By reducing the residual gas absorbed on fuel pellets during sintering, the need for an outgassing step is avoided. The quantities of oxygen introduced into the sintering atmosphere to control residual gas absorption are maintained below the levels that cause oxidation of molybdenum components.

MOX fuel pellets are typically sintered in a sintering furnace in a reducing atmosphere with a maximum of 6% hydrogen for safety reasons. The reducing atmosphere results in removal of oxygen from the metal component of the fuel, the amount of oxygen removed being dependent upon the temperature. The amount of gas absorbed during sintering of MOX fuel pellets is a function of the oxygen-to-metal ratio of the fuel. By introducing small quantities oxygen during the sintering process in accordance with the present invention, the extent of that absorption can be reduced.

Oxygen can be introduced into the sintering furnace via the introduction of, for example, water, carbon dioxide or other oxygen-containing gas from which free oxygen is liberated (eg CO, $NO_2$ and $NO_3$), advantageously, at a temperature in the range of about 500°–600° C. In the 300° to 700° C. temperature range, oxygen is preferentially absorbed on free sites in the fuel pellets over sintering carrier gases, or other gases present in the sintering atmosphere (including gases that are sintering products) (eg nitrogen, hydrogen, carbon dioxide, or methane). The preferential absorption of oxygen during cooling (eg between 300°–700° C.) results in desirable, low residual gas values.

In accordance with the present method, oxygen is introduced, advantageously, counter current to fuel flow. Introduction at the exit end of the furnace is preferred as the presence of oxygen in the cool down portion of the furnace is assured and thus consistent results are obtained. When oxygen additions are made into areas of the furnace from which diffusion into the cooling portion can occur, the amount of gas is adjusted upward to achieve an appropriate reduction in residual as in the resulting fuel. The optimum amount of oxygen introduced can be readily determined for any particular furnace and any introduction site.

Figure 1:
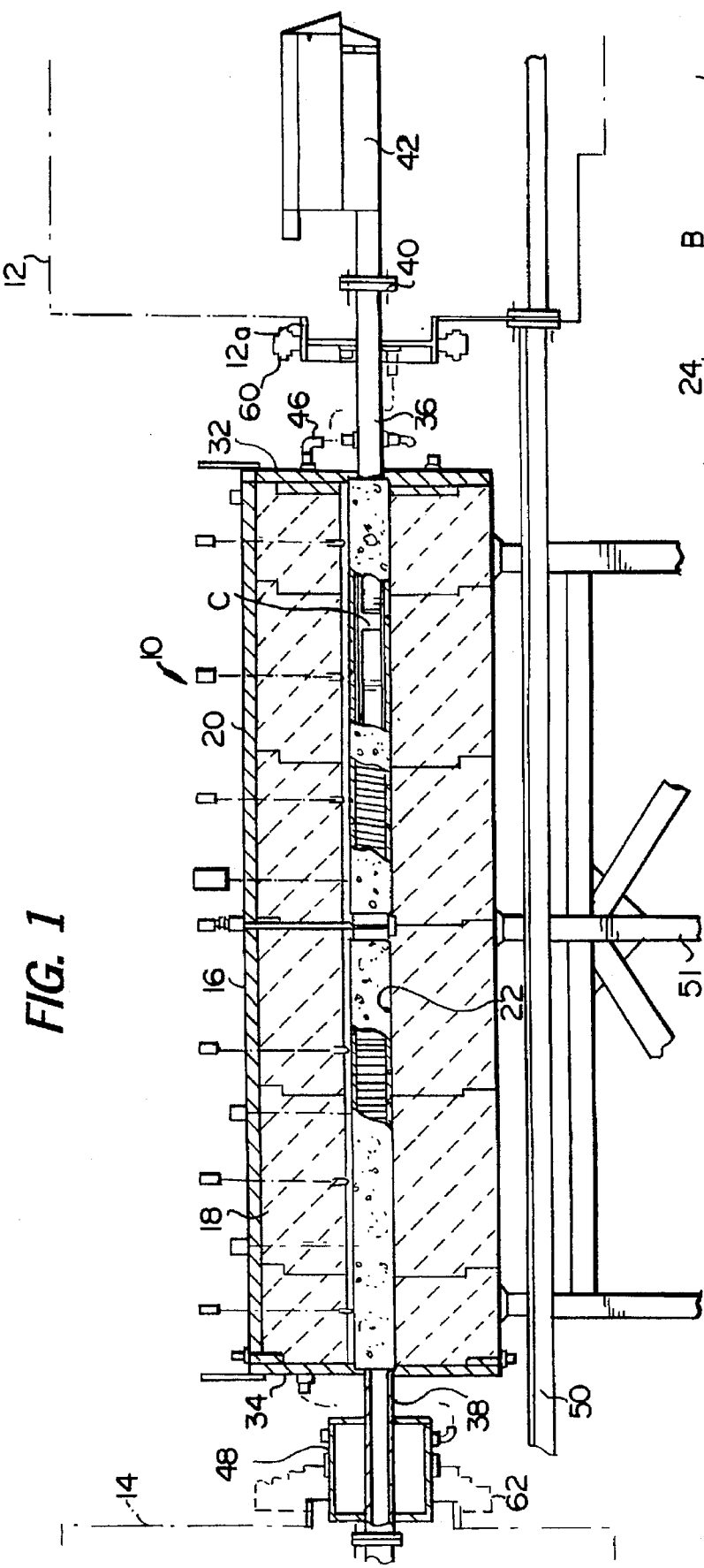
FIG. 1. Longitudinal axial cross-sectional view through sintering furnace disposed in a glove box line as described in U.S. application Ser. No. 08/434,680. With the exception of gas addition ports 64, the remaining numerals relate to aspects of the furnace as described in application Ser. No. 08/434,680.
Figure 6:
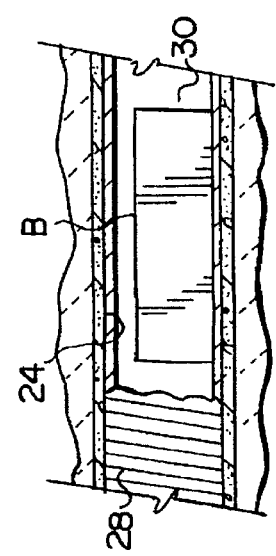
Figure 5:
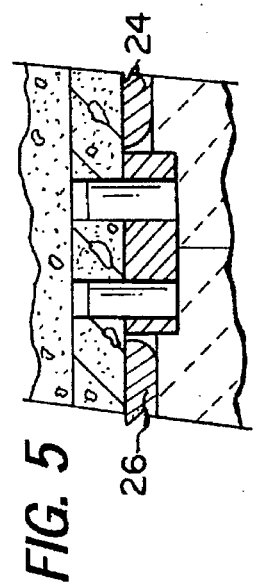
Figure 2:
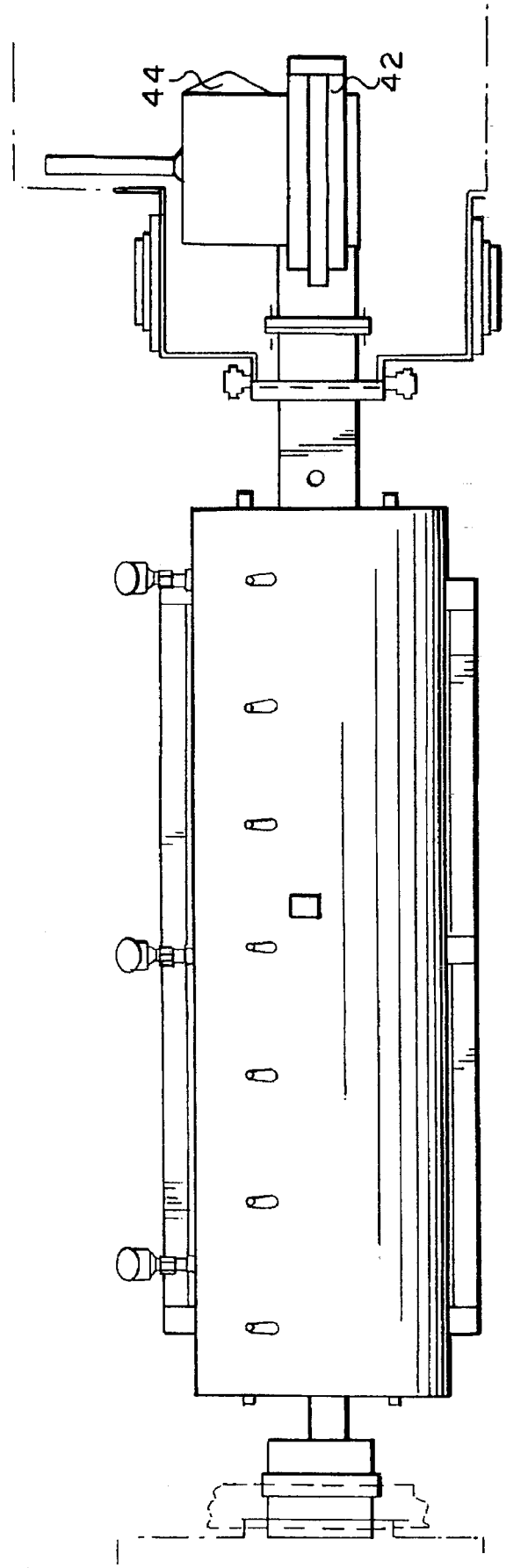
Figure 3:
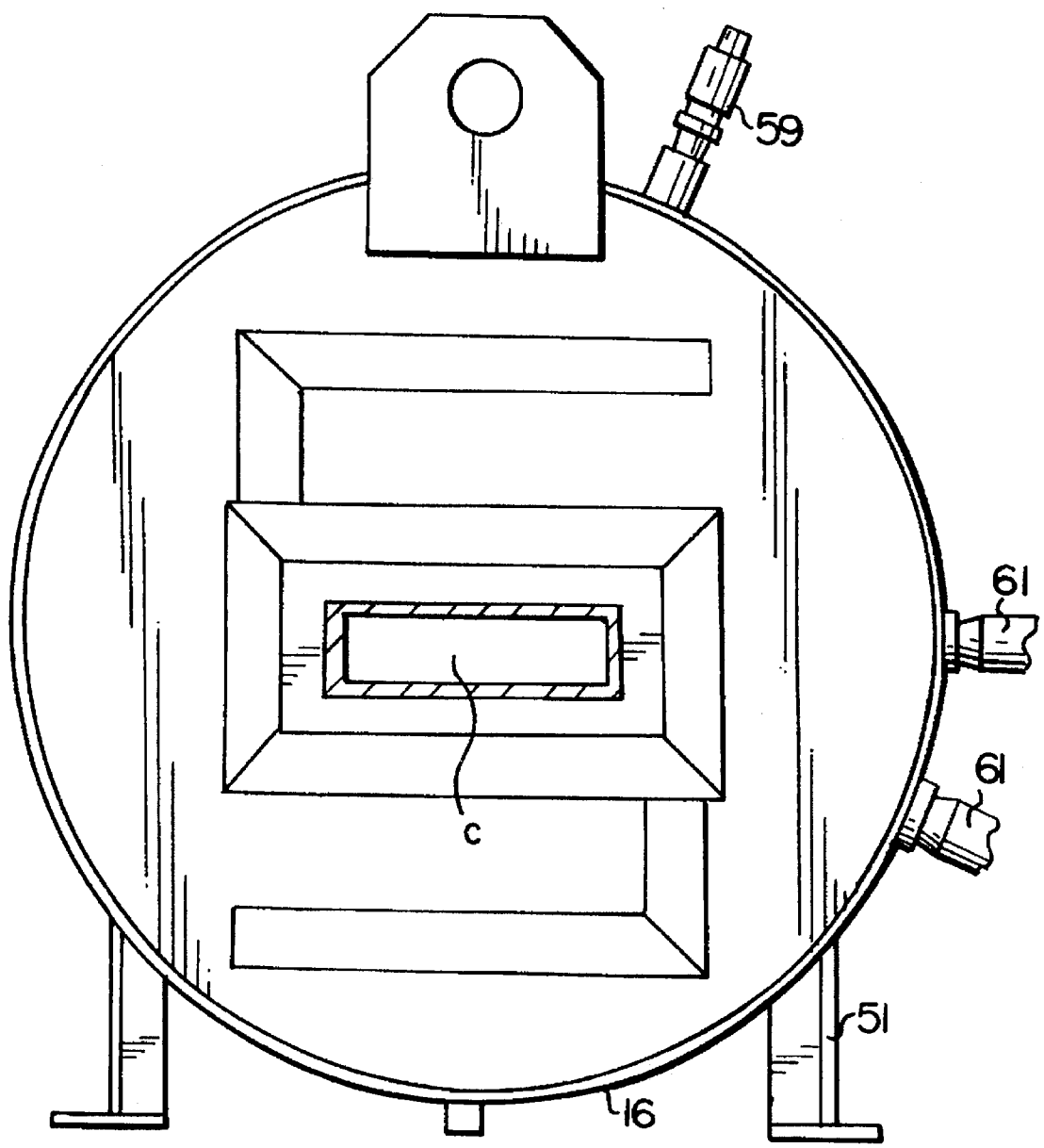
Figure 4:
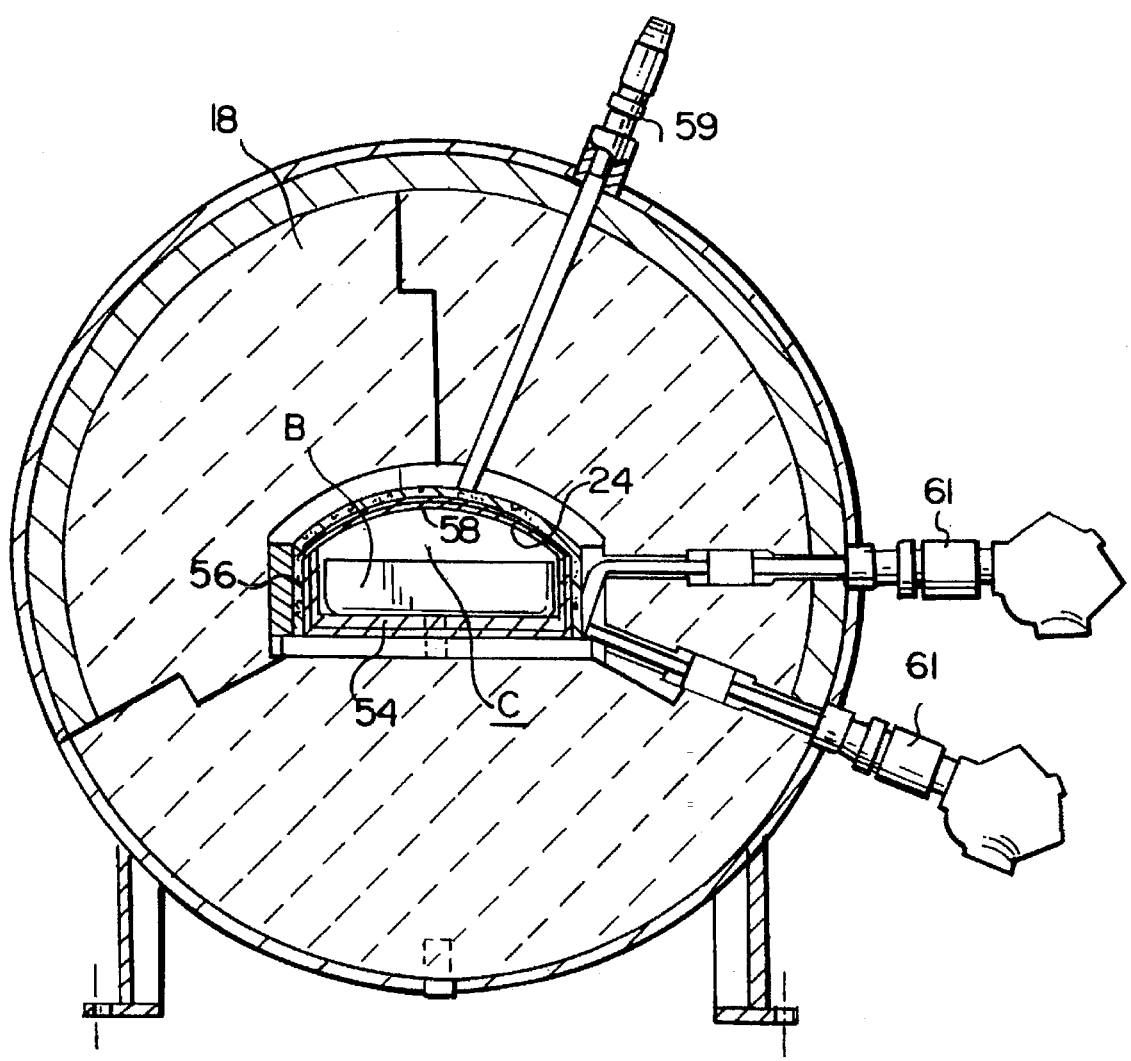
Figure 7:
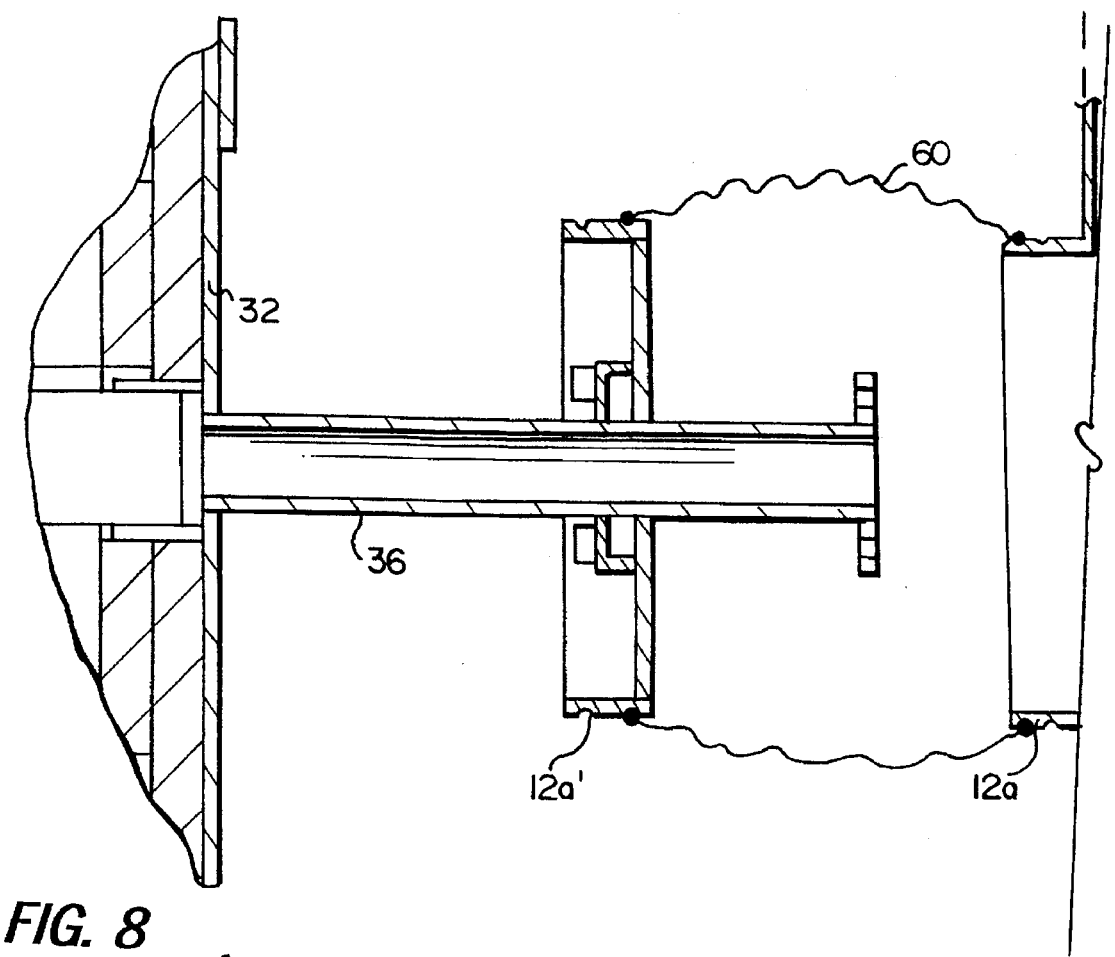
Figure 8:
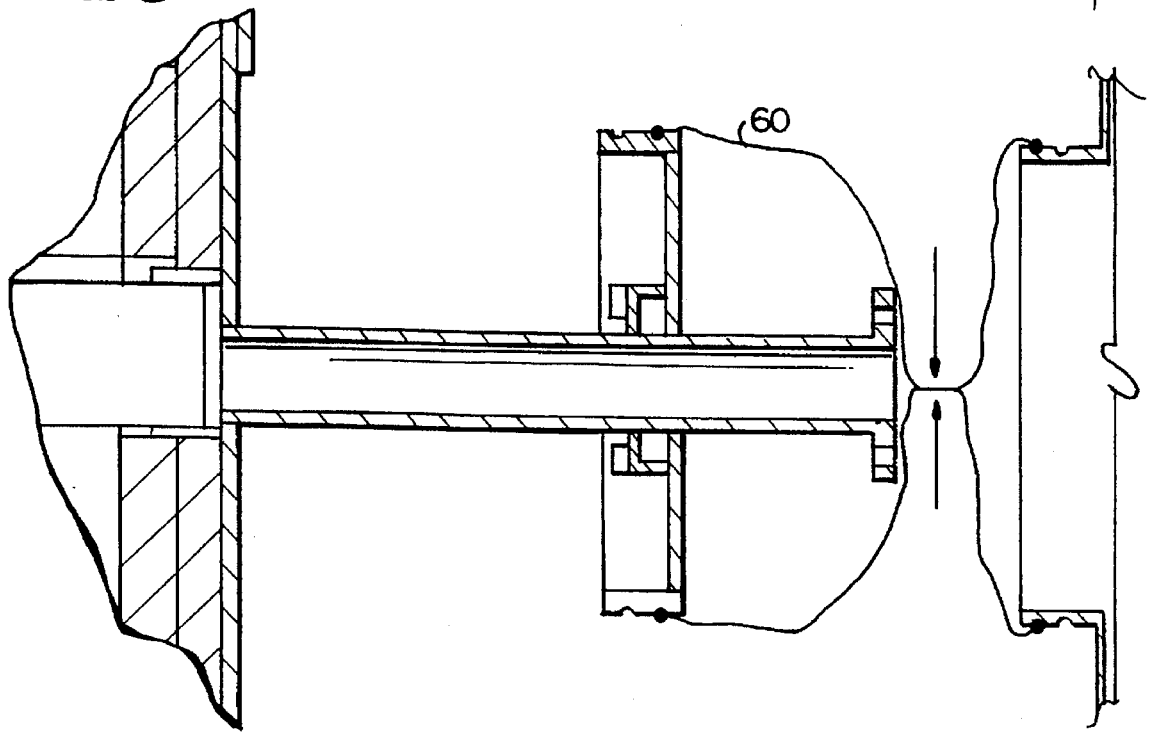
Figure 9A:
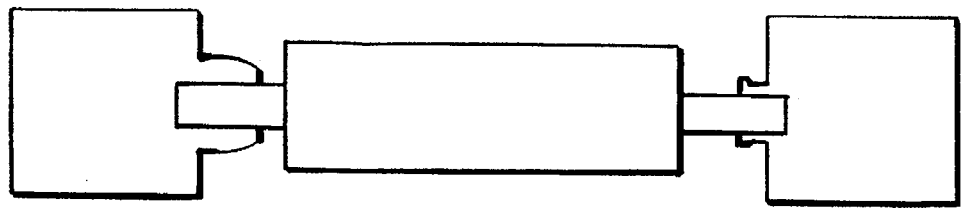
Figure 9B:
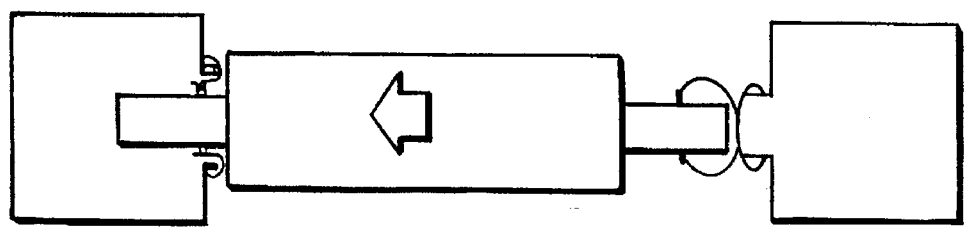
Figure 9C:
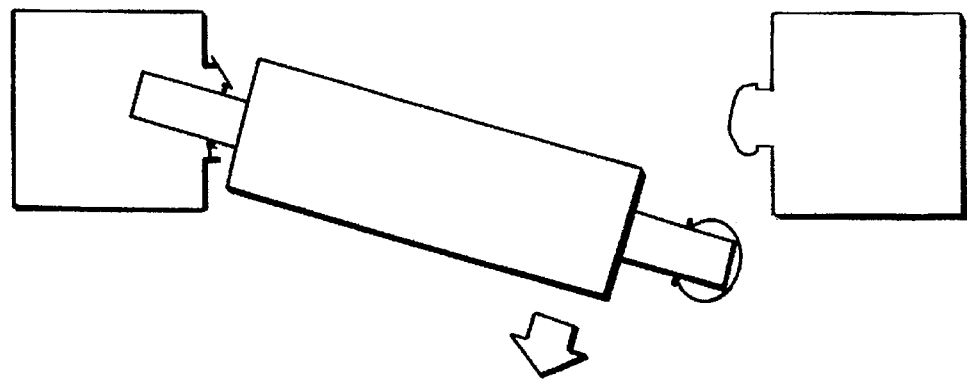
Figure 9D:
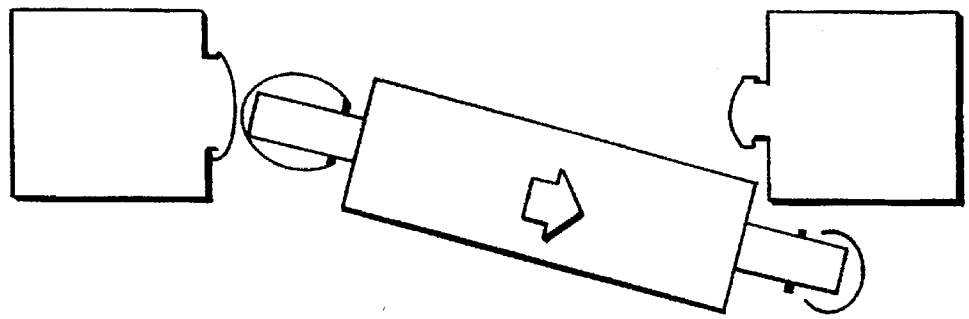

U.S. application Ser. No. 08/434,680 (the contents of which is incorporated herein by reference) discloses a sintering furnace designed for the production of MOX nuclear fuel pellets. Referencing that furnace (see FIG. 1) and the use of $CO_2$ by way of example, $CO_2$ can be introduced at essentially any point in the furnace via a gas addition port 64, introduction at the exit end in the direction opposite the fuel flow, however, being particularly advantageous as oxygen (liberated from the $CO_2$) contact with the fuel during cooling is thereby optimized.

Certain aspects of the present invention are described in greater detail in the non-limiting Example that follow.

EXAMPLE

Presented in Table 1 are data related to MOX fuel pellets processed using different protocols. The data were obtained from experimental testing in two different furnaces. The testing revealed that consistent absorbed gas results could be obtained for the same oxygen-to-hydrogen ratios in the sintering gas. The data are thus segregated by either water or carbon dioxide-to-hydrogen ratio.

The pellet density is given in Table 1, together with the sintering atmosphere. Additions of $H_2O/H_2$ or $CO_2/H_2$ were made as indicated at the exit end of the sintering furnace. For the three entries with water to hydrogen ratios <0.01, no oxygen additions were made to the sintering furnace. The addition of moisture to the cool-down portion of the sintering furnace resulted in residual gas content values in the 5–15 μl/g range. Carbon dioxide addition resulted in the same reduction in the gas content for MOX fuel.

TABLE 1

| | | Residual Gas Content Data | | | | | |
|---|---|---|---|---|---|---|---|
| | Pellet | | | | Absorbed Gas Content | | |
| | Density | Sintering | Sintering Additions | | X Bar | Sigma | |
| Material | (% TD) | Atmosphere | $H_2O/H_2$ | $CO_2/H_2$ | (μl/gm) | (μl/gm) | n* |
| MOX | 92 | 6% $H_2$—$N_2$ | <0.01 | — | 61.4 | 3.8 | 7 |
| MOX | 92 | 6% $H_2$—$N_2$ | <0.01 | — | 56.5 | 16.0 | 21 |
| MOX | 92 | 6% $H_2$—$N_2$ | <0.01 | — | 58.2 | — | 1 |
| MOX | 92 | 6% $H_2$—$He_2$ | 0.09 | — | 6.3 | 7.3 | 4 |
| MOX | 92 | 6% $H_2$—$N_2$ | 0.09 | — | 7.7 | 2.3 | 8 |
| MOX | 92 | 6% $H_2$—$N_2$ | 0.09 | — | 7.8 | 4.2 | 114 |
| MOX | 92 | 6% $H_2$—$N_2$ | — | 0.11 | 8.7 | 0.6 | 3 |
| MOX | 91 | 6% $H_2$—$N_2$ | — | 0.06 | 13.5 | 3.8 | 8 |
| MOX | 91 | 6% $H_2$—$N_2$ | — | 0.08 | 10.5 | 4.6 | 6 |

*n = number of samples

All documents cited above are hereby incorporated in their entirety by reference.

One skilled in the art will appreciate from a reading of this disclosure that various changes in form and detail can be made without departing from the true scope of the invention.

What is claimed is:

1. A method of reducing the residual gas content of mixed oxide (MOX) nuclear fuel comprising sintering said fuel in a sintering furnace in a reducing atmosphere and contacting said fuel during cool down stage of said sintering with oxygen so that the absorption of said gas by said fuel is inhibited.

2. The method according to claim 1 wherein said oxygen is liberated from water or carbon dioxide introduced into said sintering furnace.

3. The method according to claim 1 wherein said contacting is effected at a temperature of about 700° or less.

4. The method according to claim 2 wherein said water or carbon dioxide is introduced at an exit end of said sintering furnace.

5. The method according to claim 1 wherein the reducing atmosphere comprises $H_2$—$N_2$.

6. The method according to claim 1 wherein said residual gas comprises nitrogen.

* * * * *